Oct. 6, 1964 P. J. KENNEY 3,151,861
MATRIX RECONDITIONING VISE
Filed Nov. 17, 1960 2 Sheets-Sheet 1
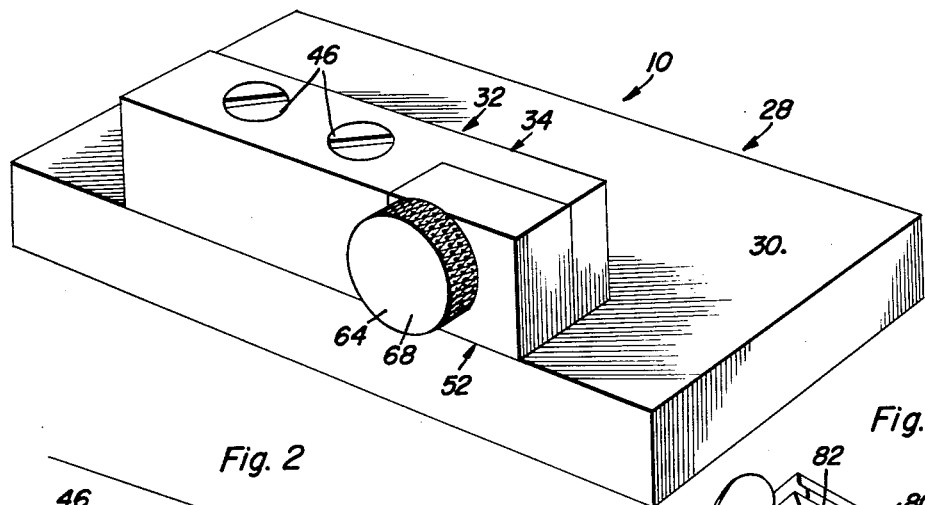
Fig. 1
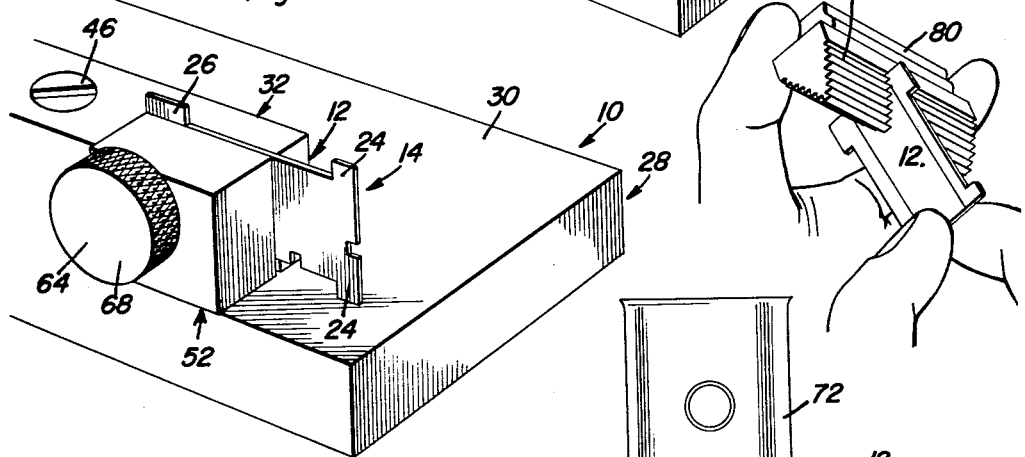
Fig. 2
Fig. 8
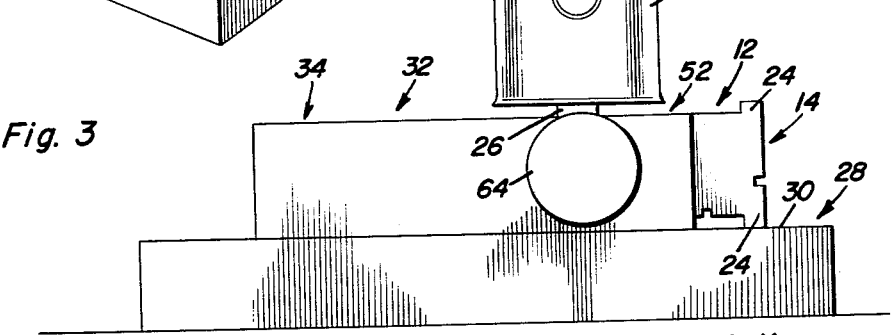
Fig. 3
Peter J. Kenney
INVENTOR.

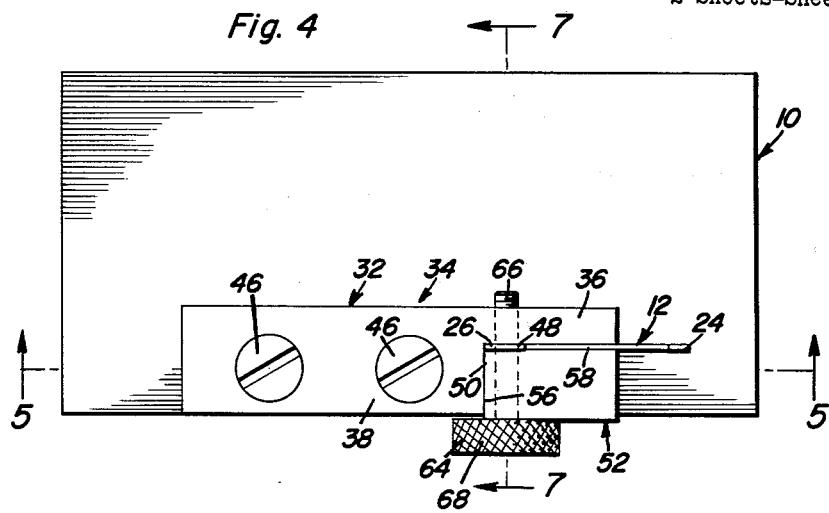
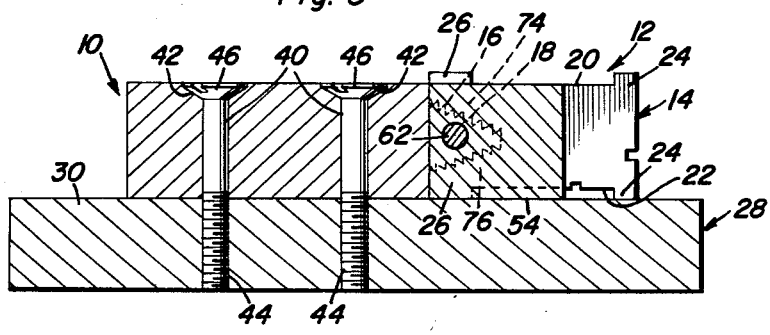
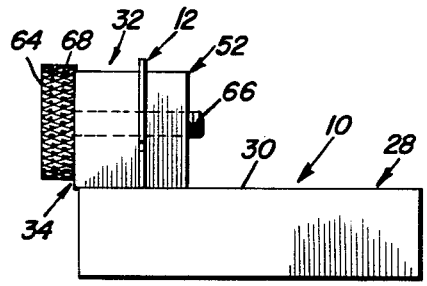
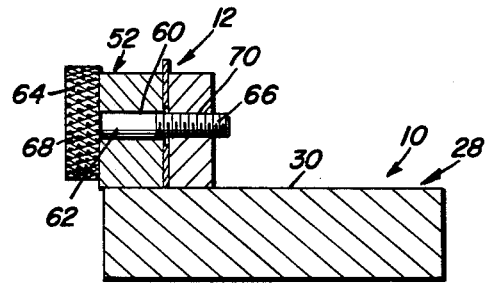

United States Patent Office 3,151,861
Patented Oct. 6, 1964

3,151,861
MATRIX RECONDITIONING VISE
Peter J. Kenney, 766 Walnut St., Pottsville, Pa.
Filed Nov. 17, 1960, Ser. No. 70,000
2 Claims. (Cl. 269—252)

This invention relates to a vise specifically adapted to recondition matrices which have become worn or damaged through usage.

Each individual letter on a Linotype or Intertype line casting machine has its own tooth combination. As the matrices of a Linotype, each individual mold, into which hot metal is forced to make a line of type, are moved across a distributor bar by means of a conveying mechanism usually in the form of three revolving screw members, the matrices drop off the bar into their respective channels in the machine to be used over and over again. The distributor bar is a bar which is generally triangular in cross-section and is provided with a plurality of longitudinally extending and parallel teeth on two adjacent surfaces thereof. The matrices are each provided with a V-shaped recess including teeth adapted to interengage with the teeth of the distributor bar and the measurement between corresponding teeth formed in the V-shaped recess in the matrices must remain constant. If they become worn because of repeated usage or the portions of the matrices defining the V-shaped recess become spread, the matrices run loosely on the distributor bar and may fall off into the wrong channels or possibly they may fall off and lay flat across the entrance of a channel of the Linotype causing subsequent proper dropping of matrices from the distributor bar to be interfered with and possibly causing these normal matrices to drop in wrong channels. When the normal dropping of the matrices from the distributor bar is disrupted, expensive time delays are incurred. The machine operator has to pick out the wrong mat in an assembled line of type and possibly the operation of the Linotype is interrupted while a machinist is called to repair damage inflicted upon the machine by the normal dropping of the matrices from the distributor bar being interrupted. If the operator of a Linotype does not see the wrong matrices in an assembled line of type, they show up as a misprint on the proof. The main object of this invention is to provide a matrix reconditioning device which may be utilized to recondition worn or spread matrices so that continued use of the same may be realized without malfunction of the Linotype. The matrices are constructed of brass and are quite expensive to replace when considering the number which become spread or otherwise damaged in normal operation.

A further object of this invention is to provide a matrix gage substantially identical to a section of the distributor bar of a Linotype machine by which the matrices may be checked for looseness or tightness after having been straightened by the matrix reconditioning vise of the instant invention.

A final object to be specifically enumerated herein is to provide a matrix reconditioning vise which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the matrix reconditioning vise of the instant invention;

FIGURE 2 is a fragmentary perspective view of the vise shown with a matrix disposed therein;

FIGURE 3 is a side elevational view of the matrix reconditioning vise illustrating the manner in which a matrix may be reconditioned thereby;

FIGURE 4 is a top plan view of the vise;

FIGURE 5 is a vertical longitudinal sectional view taken substantially upon the plane indicated by the section line 5—5 of FIGURE 4;

FIGURE 6 is an end elevational view of the vise shown with a matrix disposed therein;

FIGURE 7 is a transverse vertical sectional view taken substantially upon the plane indicated by the section line 7—7 of FIGURE 4; and FIGURE 8 is a perspective view of a matrix gage simulating a section of the distributor bar of a Linotype machine by which the shape and condition of matrix may be determined.

With attention now directed more particularly to the drawings, the numeral 10 generally designates the matrix reconditioning vise of the instant invention. The vise 10 is adapted to be used in connection with matrices such as that generally designated by the reference numeral 12. The matrix 12 includes a generally elongated and planar body generally referred to by the reference numeral 14 which is provided with a V-shaped recess 16 in one end thereof whose confronting surfaces are provided with teeth 18. The longitudinal side edges 20 and 22 of the matrix 12 are provided with pairs of transversely extending tabs 24 and 26 which project outwardly from the opposite ends of the side edges 20 and 22.

The vise 10 includes a generally rectangular base generally referred to by the reference numeral 28. It is to be understood that the base 28 may be of any configuration but that the upper surface 30 thereof is planar.

Vise means generally referred to by the reference numeral 32 is secured to the base 28 and includes a generally L-shaped jaw member generally designated by the reference numeral 34. The jaw member 34 includes a first leg 36 and a second leg 38 which is provided with a pair of bores 40 including counterbores 42. The base 28 is provided with threaded bores 44 registrable with the bores 40 and a pair of threaded fasteners 46 are utilized to removably and rigidly secure the first jaw member 34 to the base 28. The first jaw member 34 includes a pair of confronting planar surfaces 48 and 50 with the planar surface 48 also constituting the planar abutment face against which the matrix 12 is to be compressibly engaged by means of the second jaw member which is generally designated by the reference numeral 52. The planar surfaces 48 and 50 are disposed at right angles to each other and to the planar upper surface 30 of the base 28. The second jaw member 52 is provided with three mutually perpendicular adjoining planar surfaces 54, 56 and 58 and it will be noted that the second jaw member 52 has its planar surface 54 disposed in sliding contacting relation with the upper planar surface 30 of the base 28 and the planar surfaces 56 and 58 disposed in parallel relation to the planar surfaces 50 and 48 respectively of the jaw member 34. The second jaw member 52 is provided with a transverse bore 60 which is disposed at right angles to the planar face 58 and opens therethrough and through the surface of the jaw member 52 remote from the planar face 58. The shank 62 of a headed fastener 64 is rotatably journalled in the bore 60 and the threaded terminal end 66 thereof remote from the head 68 is threadedly engaged in a threaded bore 70 formed in the first jaw member 34. The threaded bore 70 extends through the leg 36 of the first jaw member and is disposed at right angles to the planar face 48 thereof.

It will be noted that the height of the jaw members 34 and 52 is such that when the matrix 12 is disposed therebetween such as illustrated in FIGURE 5 of the drawings the tabs 24 and 26 carried by the upper side edge 20 thereof will project above the upper surface of the jaw members 34 and 52 whereby the tab 26 may be engaged by an impact implement such as that indicated at 72 in FIGURE 3 in order to urge the arms 74 and 76 of the matrix 12 defining the V-shaped recess 16 toward each other.

The matrix gage generally designated by the reference numeral 80 in FIGURE 8 of the drawings is utilized to check the spread of the arms 74 and 76 of the matrix 12 and the teeth 18 thereon for wear in a manner which is believed to be obvious. Should the arms 74 and 76 be found to be spread apart an excess amount or should the arms 74 and 76 be found to be slightly laterally deflected from the remaining planar portion of the matrix 12, the matrix may be inserted in the vise 10 as clearly illustrated in FIGURES 2-6 of the drawings to recondition the matrix by straightening the arms 74 and 76 and by urging the arms 74 and 76 toward each other by means of the impact tool 72 as illustrated in FIGURE 3 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A matrix reconditioning vise for Linotype machine matrices of the type having a substantially planar elongated body and pairs of opposite side transversely extending tabs on opposite ends thereof and a V-shaped recess in one end defined by a pair of outwardly divergent arms, said vise comprising a rigid base including a planar surface, vise means mounted on said base, said vise means including a pair of jaws members one mounted rigidly on said planar surface and having a first planar face disposed in substantially right angles to said planar surface, the other of said jaw members including a second planar face, means suppoting said other jaw member from said one jaw member with said first and second planar faces opposing and generally paralleling each other and for movement of said other jaw member relative to said base and over said planar surface toward and away from said one jaw member, said jaw members being adapted to receive at least the recessed end of a matrix therebetween whereby the arms defining the V-shaped recess in that end of the matrix may be compressively engaged between said first and second planar faces so that an impact or other suitable tool may be used to urge the free ends of the arms of the matrix together without the arms being laterally deflected or twisted about their longitudinal axes, said one jaw member comprising a generally L-shaped member fixedly secured to the planar surface of the base, said L-shaped member including a pair of legs having adjacent planar surfaces disposed at substantially right angles to each other and to the planar surface of said base, one of said planar surfaces of one jaw comprising said first planar face, the other jaw member including three mutually perpendicular adjoining surfaces and received within the angle formed by said adjacent surfaces of said one jaw member with one of said mutually perpendicular surfaces disposed in sliding contacting relation with said planar surface of said base and the other two of said mutually perpendicular surfaces disposed in parallel relation to the adjacent planar surfaces of said one jaw member, said supporting means effecting movement of said other jaw member relative to said base and in a direction parallel to one pair of parallel surfaces of said jaw members, the distance said jaw members project away from said planar surface of said base being set so as to enable said jaw members to be adapted to receive the matrix with the outer ends of the tabs along one side edge disposed on the planar surface of said base between said first and second planar faces of said jaws while the tabs on the other side edge of the matrix project beyond the surfaces of the jaw members remote from the planar surface of said base.

2. The combination of claim 1, wherein said supporting means includes a screw member journalled through said one of said jaw members for movement about an axis disposed at right angles to and passing through one of said first and second planar faces thereof, and a threaded bore formed in said other jaw member threadingly receiving said screw member.

References Cited in the file of this patent

UNITED STATES PATENTS

| | | |
|---|---|---|
| 546,903 | Ryan | Sept. 24, 1895 |
| 855,989 | Shear et al. | June 4, 1907 |
| 977,878 | Johnson | Dec. 6, 1910 |
| 1,737,506 | McCracken | Nov. 26, 1929 |
| 1,841,196 | Mass | Jan. 12, 1932 |